United States Patent
Kaneko

[11] Patent Number: 6,033,051
[45] Date of Patent: *Mar. 7, 2000

[54] INK-JET PRINTING APPARATUS WITH HEAD RECOVERY CONTROLLED ACCORDING TO NUMBER OF INK EJECTIONS

[75] Inventor: Mineo Kaneko, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/563,605

[22] Filed: Nov. 28, 1995

[30] Foreign Application Priority Data

Dec. 1, 1994 [JP] Japan ................................. 6-298312

[51] Int. Cl.[7] ............................. B41J 2/165; B41J 29/38
[52] U.S. Cl. ............................................. 347/23; 347/13
[58] Field of Search .................... 347/23, 5, 19, 347/15, 14, 13

[56] References Cited

U.S. PATENT DOCUMENTS 5,539,433  7/1996  Kawai et al. ........................ 347/15
5,625,384  4/1997  Numata ............................... 347/49

FOREIGN PATENT DOCUMENTS

| 0401204 | 12/1990 | European Pat. Off. | B41J 2/165 |
| 0443808 | 8/1991 | European Pat. Off. | B41J 2/165 |
| 0546838 | 6/1993 | European Pat. Off. | B41J 2/21 |
| 0589581 | 3/1994 | European Pat. Off. | |
| 2141248 | 8/1990 | Japan | B41J 2/165 |
| 05064890 | 3/1993 | Japan | |
| 406155742 | 6/1994 | Japan | B41J 2/05 |

*Primary Examiner*—N. Le
*Assistant Examiner*—Thien Tran
*Attorney, Agent, or Firm*—Fitzpatrick, Cella, Harper & Scinto

[57] ABSTRACT

An ink-jet printing apparatus is capable of restricting recovering operation for a printing head into necessary minimum times for preventing defect to be caused upon printing, limit waste ink amount and avoid possibility of damaging the printing head. Thus, the apparatus divides nozzles having nozzle number of 1 to 512 into 8 nozzle blocks. With respect to each nozzle block, number of ink ejection data in the corresponding image data is integrated. When the integrated value becomes greater than or equal to a predetermined value, the recovering operation is taken place for the printing head.

20 Claims, 10 Drawing Sheets

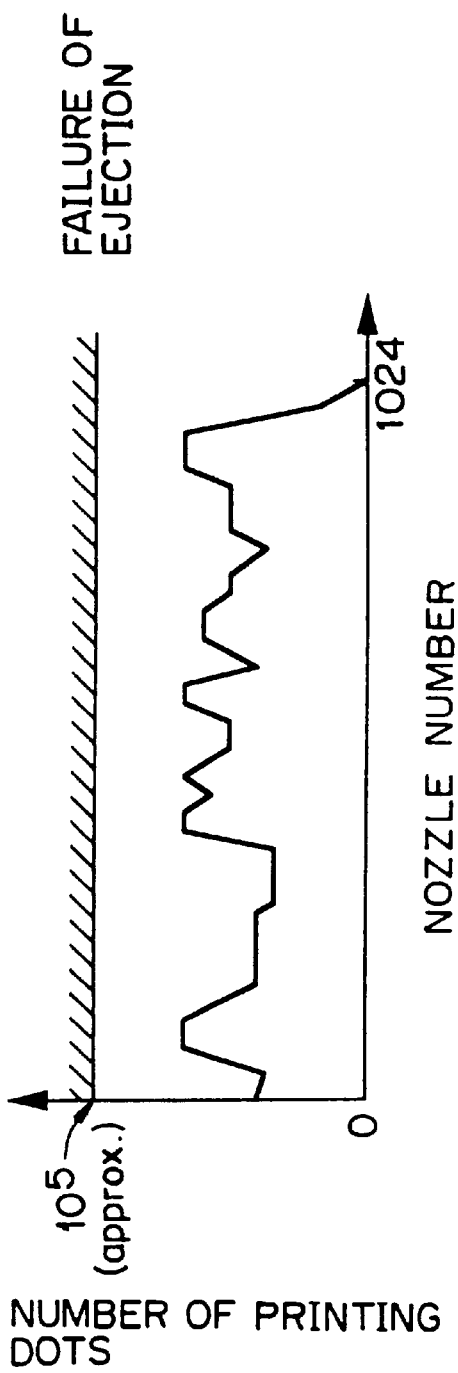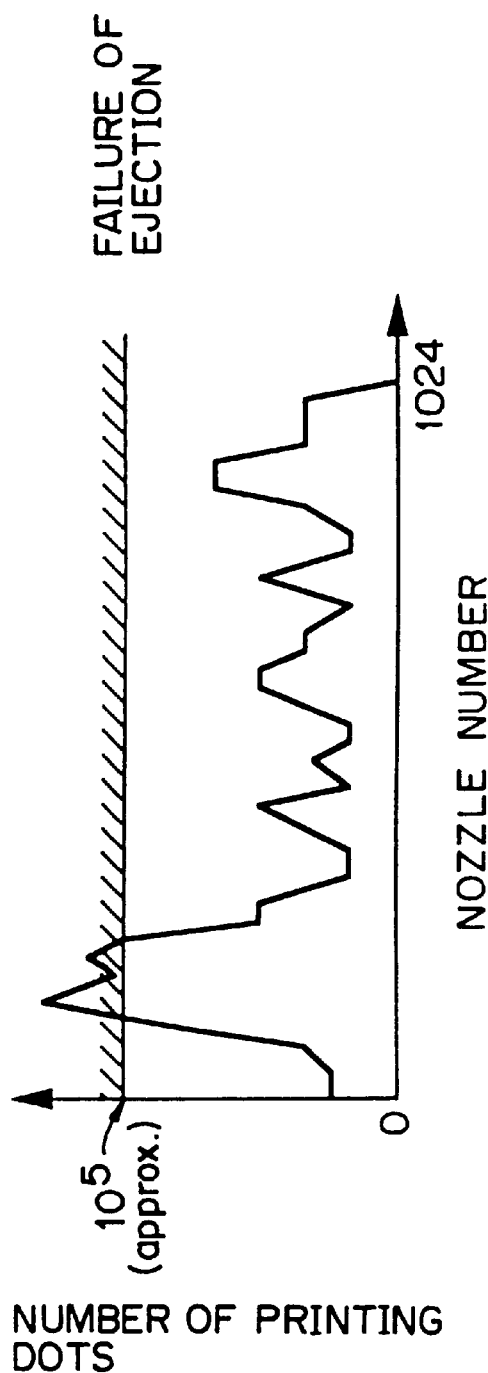
FIG. 10A
IN THE CASE DIFFERENCE OF FREQUENCY OF USE OF NOZZLES IS SMALL
FIG. 10B
IN THE CASE DIFFERENCE OF FREQUENCY OF USE OF NOZZLES IS LARGE

INK-JET PRINTING APPARATUS WITH HEAD RECOVERY CONTROLLED ACCORDING TO NUMBER OF INK EJECTIONS

BACKGROUND OF THE INVENTION

1. Field of the Invention

The present invention relates to an ink-jet printing apparatus for performing printing by ejecting ink.

2. Description of the Related Art

An ink-jet printing method is becoming a major printing method for features of high speed, high image quality and quietness. One example of the construction of the ink-jet printing apparatus is shown in FIG. 9. In FIG. 9, reference numeral 6 denotes a head for ejecting ink for printing, 7 denotes a tank for storing the ink to be supplied to the head 6, 8 denotes a platen for holding a printing medium, 9 denotes a recovering means for maintaining good printing condition. In the ink-jet printing method, printing is performed by ejecting the ink through ejection openings of fine nozzles. Therefore, when dust is deposited on the surface of the head 6 where the ejection openings are formed, ejection of the ink can be blocked to cause defects in printing. Also, by continuously repeating printing, the ink which does not reach the printing medium, may deposit on the ejection opening forming surface to cause deflection of the ejecting direction of the ink.

The recovering means 9 is provided for maintaining good condition in ejection of ink even in the case set forth above. In general, the recovering means comprises a wiping member for wiping off the dust, residual ink droplets and so forth by sweeping the ejection opening forming surface of the head 6, a pump for sucking ink through the ejection opening of the head for cleaning the ejection opening forming surface, and so forth.

However, in the prior art, upon operation of the recovering means 9, it is possible to cause damaging or wearing of the ejection opening forming surface by the wiping member, or to reduce amount of the ink to be used for printing since the ink is sucked from the ejection opening for disposal. In this respect, it is desirable to minimize the recovery operation by the recovering means 9 so that recovery process may be performed just before occurrence of failure.

Therefore, there have been proposed a method for determining a timing of recovering operation by detecting a temperature of the head, or a method for determining the recovering operation by counting a signal amount to be printed in a printing memory as disclosed in Japanese Patent Application Laid-open No. 64890/1993. On the other hand, technology is directed to high definition and high speed printing to inherently require a greater number of nozzles in the head 6 for increasing the number of dots to be printed simultaneously. Conventionally the head has in the order of 64 nozzles, but a head having 500 to 1000 nozzles and furthermore, a line head having 3000 to 4000 nozzles have also been proposed in the recent years.

However, in such a multi-nozzle head, it often causes fluctuations of frequency of use in each nozzles. In such case, it is not possible to determine the optimal timing to effect recovering operation only by detecting the temperature of the head 6 or by counting the data in the printing memory, resulting in increasing possibility of causing defects in printing.

FIG. 10 shows the number of printing dots per nozzle when printing operation is performed for a certain period after the latest recovering operation. FIG. 10A is the case where no significant difference of frequency of use among the nozzles is present and where sufficient margin is present to the region where failure of ejection is potentially caused. FIG. 10B is the case where a significant difference of frequency of use among the nozzles is present, the average number of dots is the same as that of FIG. 10A and where not all but some of the nozzles have reached the region where failure of ejection is potentially caused. In the event that an interval of recovering operation is simply shortened for avoiding the ejection failure, the amount of the ink to be disposed is increased, the possibility of damaging and/or wearing of the printing head is increased and throughput of the printing apparatus is lowered.

SUMMARY OF THE INVENTION

It is an object of the present invention to provide an ink-jet printing apparatus which can avoid failure in printing by performing a recovering operation, can minimize an amount of ink to be disposed and minimize possibility of damaging and/or wearing of a printing head by restricting number of times to perform the recovering operation to the possible minimum number.

In one aspect of the present invention, there is provided an ink-jet printing apparatus performing printing by ejecting ink from a printing head on the basis of ink ejection data in an image data, comprising:

- a printing head having a plurality of nozzles for ejecting the ink;
- recovering means for maintaining the printing head in good condition;
- counting means dividing the plurality of nozzles into a plurality of nozzle groups for counting the number of the ink ejection data in the image data for a predetermined printing amount per each nozzle group; and
- control means for operating the recovering means depending upon the result of counting by the counting means.

The control means may operate the recovering means when an integrated number of the ink ejection data as counted by the counting means becomes greater than or equal to a predetermined number, and in conjunction therewith clears the integrated value of the counting means.

Each of the nozzle groups may include nozzles overlapping with adjacent nozzle group.

The recovering means may include a wiper for scraping an ejection opening forming surface of the recording head.

The recovering means may include a pump for discharging the ink from the printing head.

The printing apparatus may be a serial scan type ink-jet printing apparatus, and the predetermined printing amount corresponds to one line.

The printing apparatus may be a serial scan type ink-jet printing apparatus, and the predetermined printing amount corresponds to one line.

The printing head may be divided into a plurality of nozzle groups for respective color inks and into a plurality of nozzle groups with respect to the black ink.

The plurality of nozzle groups for the black ink may include nozzles overlapping with adjacent nozzle group.

The counting means may include a plurality of counters respectively corresponding to the plurality of nozzle groups and means for distributing the printing data to respectively corresponding plurality of counters, and the counter generates an overflow signal when the number of ink ejection data in the printing data reaches a predetermined number.

The ink-jet printing apparatus according to the present invention plans to count the ink ejection data in the corresponding image data, and operates the recovering means at possible minimum occurrence. Thus, wasting amount of the ink can be reduced and possibility of damaging or wearing of the head can be reduced with according defect.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIGS. 10A and 10B are an explanatory illustration showing a difference of frequency of use of nozzles in the ink-jet printing apparatus.

DETAILED DESCRIPTION OF THE PREFERRED EMBODIMENT

The present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

(First Embodiment)

Figure 1:
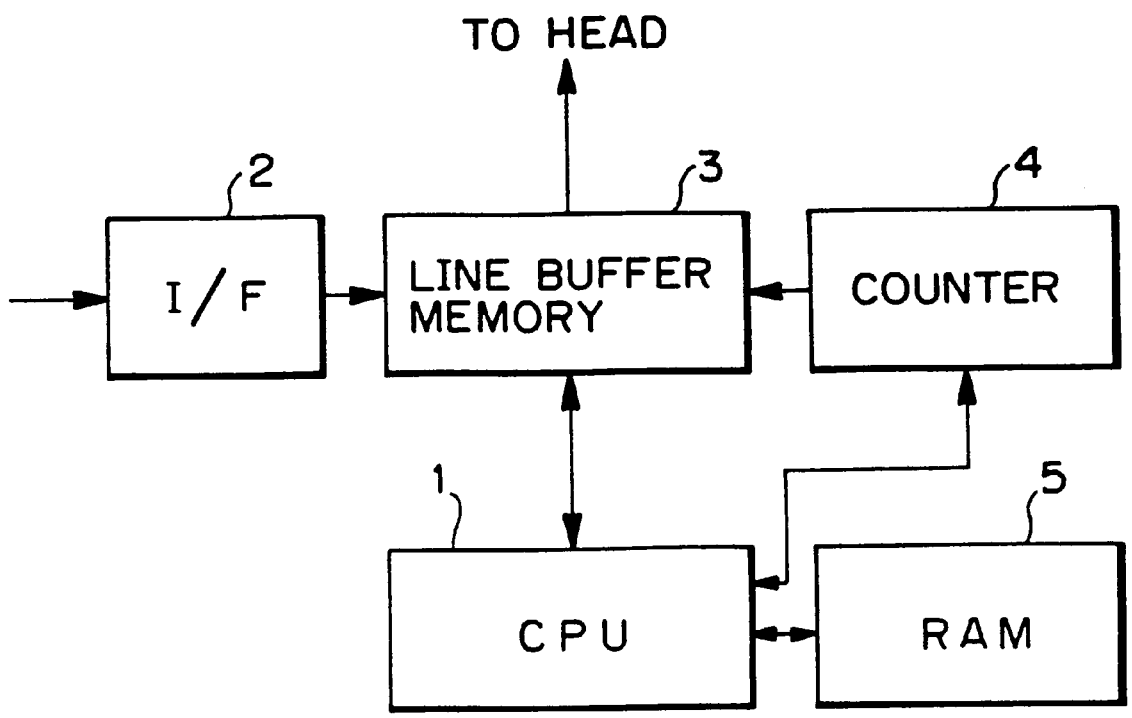
FIG. 1 is a block diagram showing general construction of a memory portion in the first embodiment of an ink-jet printing apparatus according to the present invention.

FIG. 1 shows a construction of the first embodiment of an ink-jet printing apparatus according to the present invention.

Figure 9:
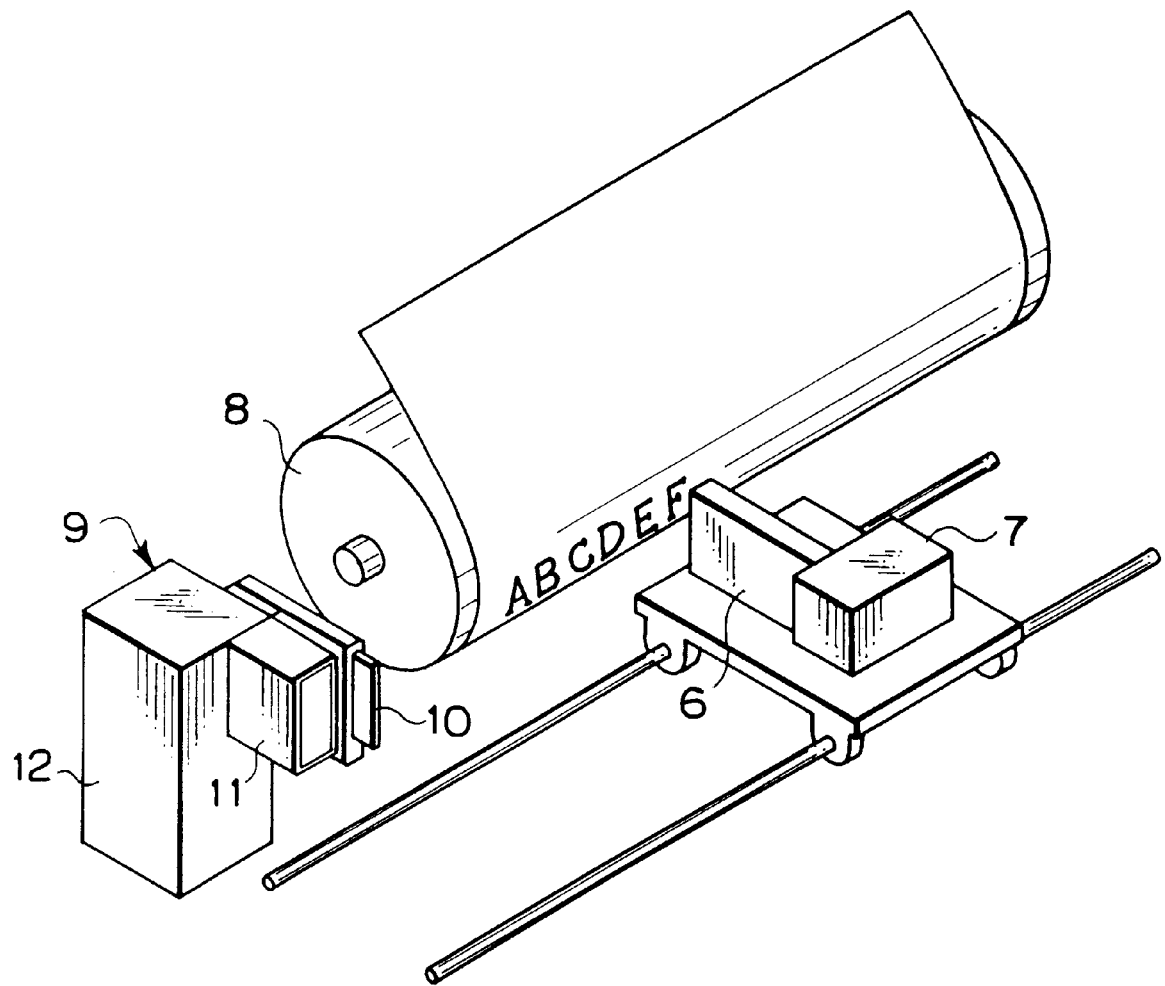
FIG. 9 is a perspective view of the major part of the ink-jet printing apparatus to which the present invention is applied.

In FIG. 1, reference numeral 1 denotes a CPU for performing control of a so-called serial scanning type printing apparatus, similarly to FIG. 9, 2 denotes an interface for externally inputting data, 3 denotes a line buffer memory for storing print data, 4 denotes a counter for counting the number of dot forming data discussed later, and 5 denotes a RAM for storing values for various setting of the printing apparatus and measured values of the counter 4. In the shown embodiment, the number of nozzles in a printing head is 512. Data processing is performed by dividing 512 of nozzles into 8 blocks respectively including 64 nozzles. The counter 4 counts data corresponding to the number of ink ejections of the nozzles per each block, namely data in the printing data for ejecting ink to form dots. Such data will be hereinafter referred to as "ink ejection data". The nozzles are formed in an alley along a subsidiary scanning direction (feeding direction of the printing medium). For respective nozzles, nozzle numbers are given for 1 to 512 in the order of the position from one side to the other side.

The operation of the shown embodiment of the ink-jet printing apparatus will be discussed with reference to FIGS. 2 and 3.

Figure 2:
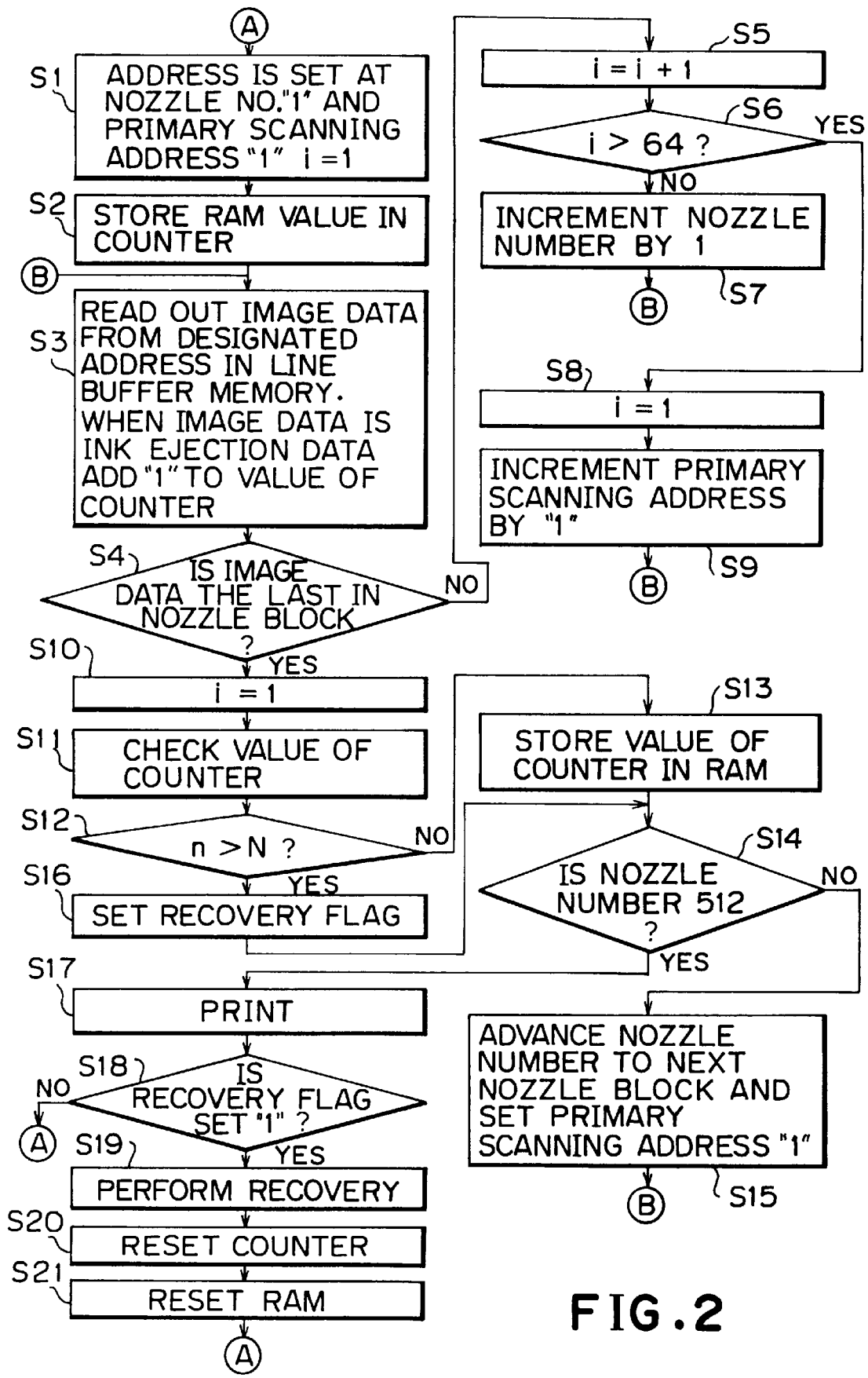
FIG. 2 is a flowchart showing operation of the first embodiment of the invention.
Figure 3:
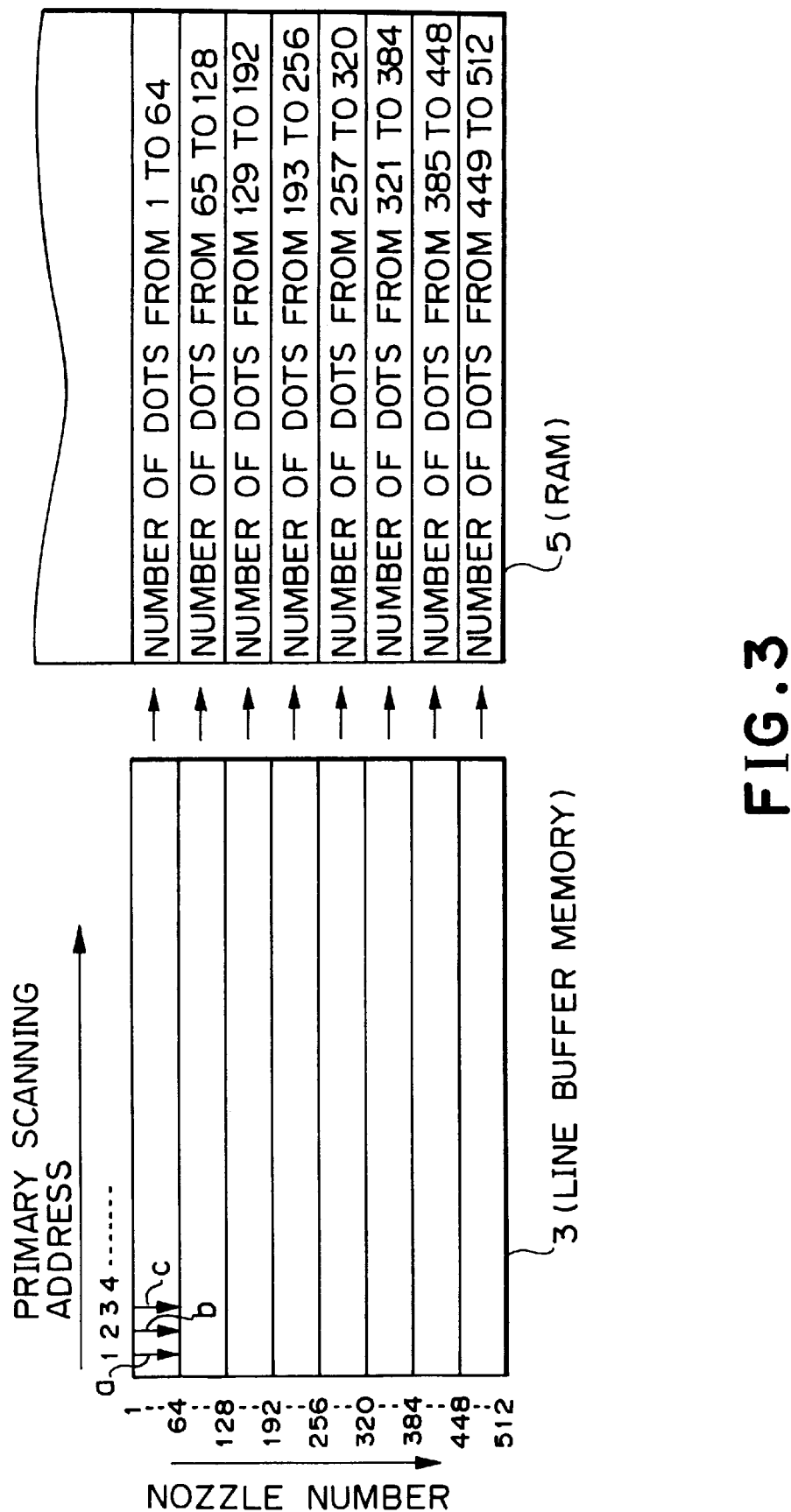
FIG. 3 is a block diagram of the major part of the first embodiment of the invention.

In FIG. 2, at first, a nozzle number is set to "1", a primary scanning address is set to "1" and a count value i is set to "1" (step S1). Then, a counter value (0 in this case) up to the preceding printing cycle is read out from the RAM 5 and stored in the counter 4 (step S2). Here, the primary address corresponds to the address of the primary scanning direction in the line buffer memory 3, as shown in FIG. 3. With the primary scanning address and the nozzle number, an address in the line buffer memory 3 is designated. Hereinafter, the address in the line buffer memory 3 thus designated will be hereinafter referred to as "designated address". Accordingly, at the step S1, initial setting is done for a designated address of the nozzle number "1" and the primary scanning address "1" in a first nozzle block having nozzle numbers 1 to 64.

Subsequently, image data is read out from the designated address in the line buffer memory 3. When the read out image data of the designated address is ink ejection data, the counter value of the counter 4 is incremented by "1" (step S3). When the image data to be read out is remained in the corresponding nozzle block, the process is advanced from step S4 to step S5 to increment the count value i by "1". Until the count value i exceeds "64", the nozzle number is incremented by "1" to return to the step S3. Accordingly, as shown by arrow a in FIG. 3, the number of the ink ejection data among the image data having the primary scanning address "1" and the nozzle numbers 1 to 64, is added sequentially.

When the count value i is "65", the process is advanced from step S6 to S8. Then, the count value i is returned to "1", the primary scanning address is incremented by "1" (step S9). Then, process is returned to step S3. Subsequently, as shown by arrow b in FIG. 3, the number of the ink ejection data among the image data having the primary scanning address "2" and the nozzle numbers 1 to 64, is added sequentially.

Thus, when the number of all of the ink ejection data in one line of the first block of the nozzle number 1 to 64 are incremented, the process is advanced from step S4 to step S10. After, the count value i is returned to "1", value n of the counter 4 is checked. Then, the value n is compared with a predetermined constant N (steps S11 and S12). If n≦N, the value n is stored in a region preliminarily reserved in the RAM 5 (step S13), and the process is advanced to step S14. On the other hand, when n≧N, a recovery flag is set to "1" (step S16), the process is advanced to the step S14.

At step S14, check is performed whether the nozzles which are objects of counting of the counter 4 includes the nuzzle number 512 which is the last nozzle. If the last nozzle is not included in the objective nozzle, the number of the nozzles are advanced to the nozzles in the second nozzle block (nozzle numbers 65 to 128). In conjunction therewith, the primary scanning address is set at "1" (steps S14, S15). Then, the process is returned to step S3. Accordingly, with respect to the first line of the second nozzle block of the nozzle numbers 65 to 128, the number of the ink ejection data is added to the counter value of the counter 4 up to the immediately preceding cycle. The value n is then compared with the constant N.

As set forth above, with respect to each of the first to eighth nozzle blocks for one line, the number of the ink ejection data is added to the counter value of the counter 4 up to the immediately preceding cycle, and the counter value n is then compared with the constant N. If n>N, the recovery flag is set. After comparison is performed up to the eighth nozzle block, printing for one line is performed at step S17.

Subsequently, check is performed whether the recovery flag is set to "1" or not (step S18). When the recovery flag is not set "1", the process is returned to step S1 to perform data processing with respect to the image data for one line in the first to eighth blocks. On the other hand, when the recovery flag as checked at step S18 is set "1", a recovery operation is performed by a recovering means 9 (see FIG. 9) (step S19). Thereafter, the counter values of the counter 4 respectively corresponding to respective nozzle blocks are reset (steps S20 and S21). Then, the process is returned to step S1.

As set forth above, in the case of shown embodiment, the nozzle group is divided into a plurality of blocks, the number of ink ejection data, namely the number of occurrence of ejection of the ink is counted with respect to each block to make judgement whether recovering operation is required or not. Therefore, even when fluctuations of the frequency of use are present among the nozzles, recovering operation can be performed at optimal timing without causing wasting of the ink with constantly maintaining the good printing quality.

(Second Embodiment)

Figure 4:
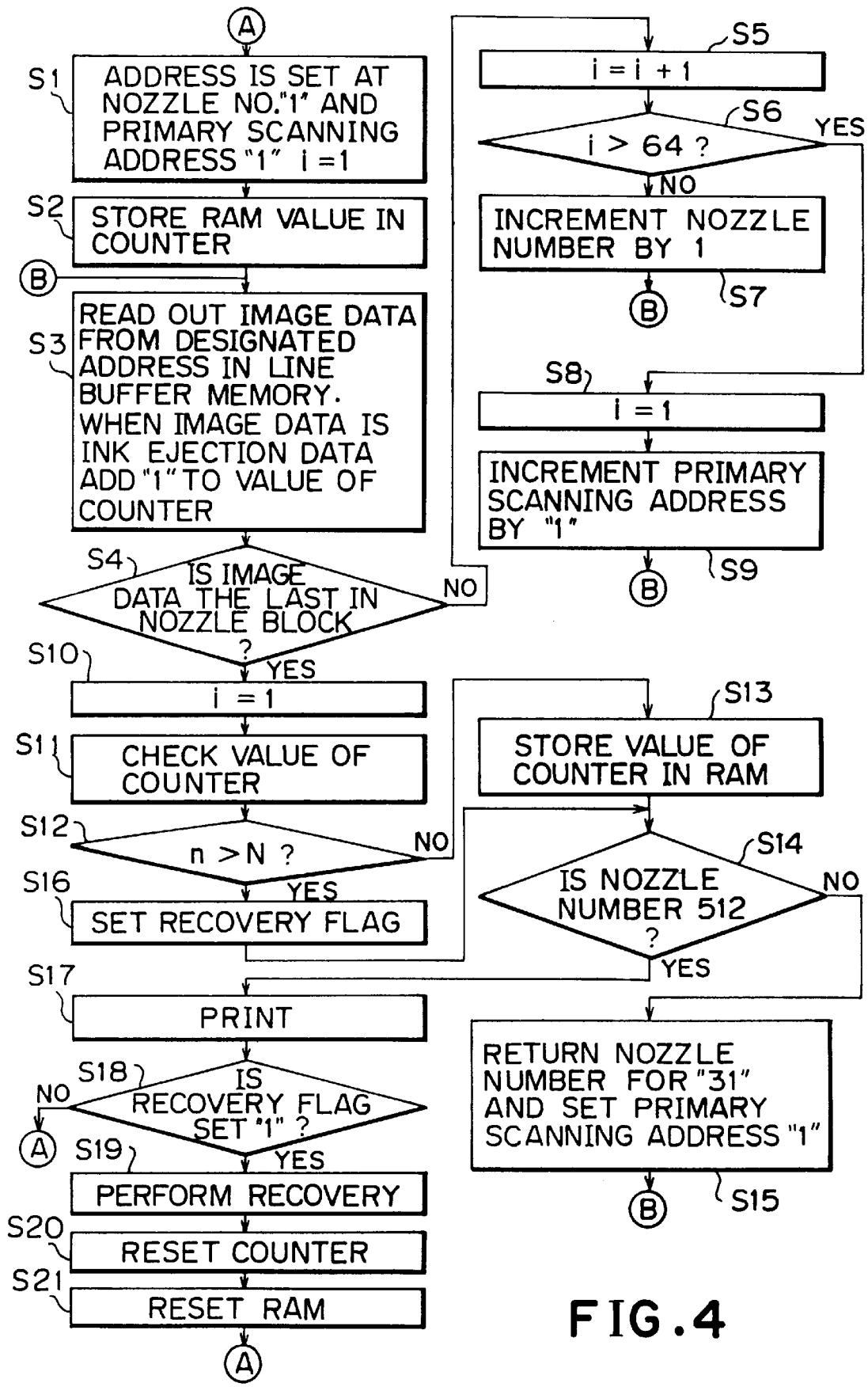
FIG. 4 is a flowchart showing operation of the second embodiment of the invention.
Figure 5:
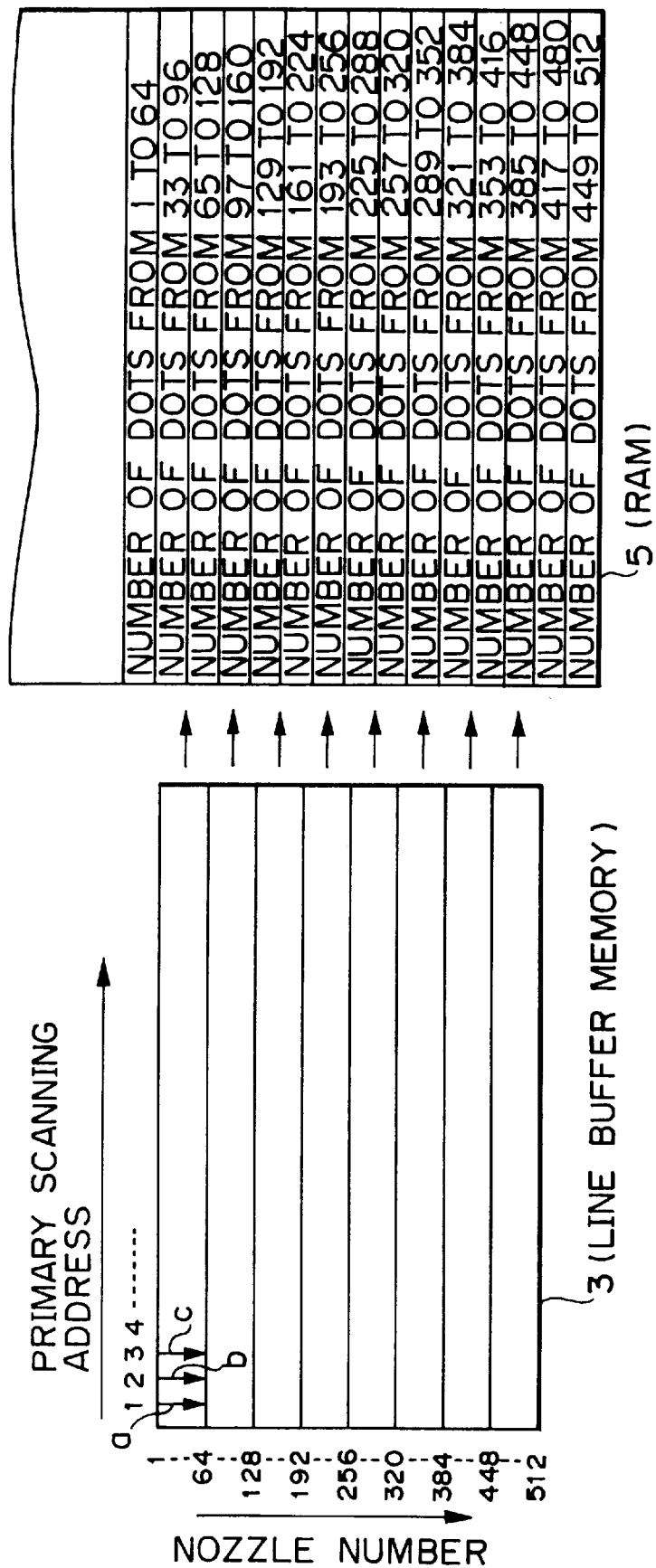
FIG. 5 is an illustration showing general construction of a memory portion of the second embodiment of invention.

FIGS. 4 and 5 are illustrations for explaining the second embodiment of the present invention.

In the shown embodiment, a printing head having 512 nozzles is employed. As shown in FIG. 5, the 512 nozzles are divided into 15 blocks (per every 64 blocks) for performing data processing for respective blocks. Namely, in each of adjacent blocks have nozzle numbers overlapping to each other.

FIG. 4 is a flowchart for explaining the operation of the shown embodiment. The shown flowchart is differentiated from the first embodiment of FIG. 2 in the process of step S15. In the shown embodiment, after counting the ink ejection data in the image data for one line of the nozzle numbers 1 to 64, the nozzle number is returned for 31 from 64 and is set at "33". In conjunction therewith, the primary scanning address is returned to "1", at step S15. Then, the ink ejection data is counted in the image data for one line of the nozzle numbers 33 to 96. Subsequently, the nozzle number is returned for 31 from 96 and is set at "65". In conjunction therewith, the primary scanning address is returned to "1", at step S15. Then, the ink ejection data is counted in the image data for one line of the nozzle numbers 65 to 128. As set forth above, at step S15, the nozzle numbers are designated so that the nozzle numbers in the nozzle block are partially overlapped with those in the adjacent nozzle number to perform counting of the ink ejection data.

As a result, while data processing becomes some what complicate, more precise judgement of the recovery timing becomes possible. Namely, by counting the ink ejection data extending over adjacent nozzle blocks (for example, blocks of 1 to 64 and 65 to 128 in the first embodiment) in an aggregating manner, it becomes possible to appropriately make judgement for necessity of recovery operation even when the ink ejection data is concentrated at the boundary of the nozzle blocks.

(Third Embodiment)

Figure 6:
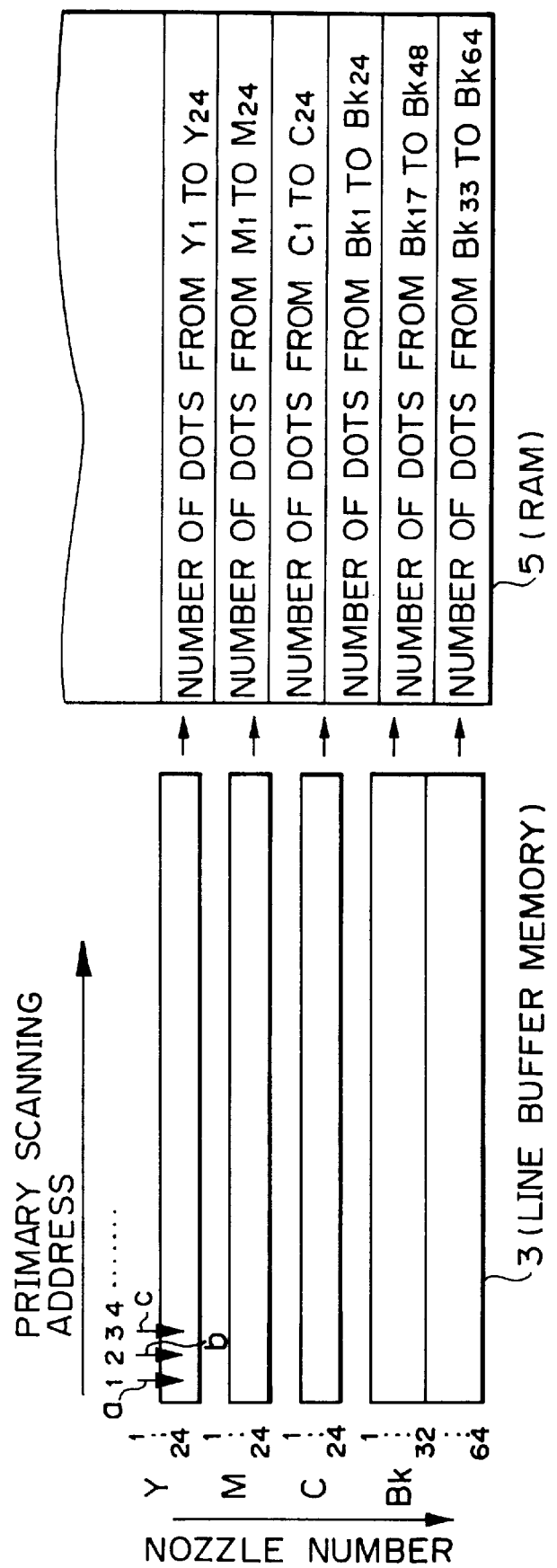
FIG. 6 is an illustration showing general construction of a memory portion of the third embodiment of invention.

FIG. 6 is an illustration showing the third embodiment of the present invention.

In the shown embodiment, the present invention is applied for the printing apparatus having four nozzle groups ejecting four colors of inks of Y (yellow), M (magenta), C (cyan) and Bk (black) within one printing head. When printing is performed with employing such printing head, the Bk ink is primarily used for printing characters, and Y, M and C inks are primarily used for printing a graphic image. Therefore, frequency of use of respective colors of nozzles is fluctuated.

Therefore, in the shown embodiment, in which respectively 24 nozzles are provided for respective of Y, M and C and 64 nozzles are provided for Bk, each group of the nozzles for Y, M and C forms one block, and 64 nozzles of Bk forms three blocks with overlapping the nozzle numbers similarly to the foregoing second embodiment. Then, by counting the ink ejection data in the printing data for each block or each ink color, optimal timing for performing recovery operation can be determined even when the frequency of use of the nozzles is fluctuated.

On the other hand, it is occasionally preferred to vary viscosity and/or surface tension of the ink, or the ink amount per one dot between the nozzle groups of Bk ink and the nozzle groups of Y, M and C inks in the character printing and the graphic image printing. For instance, in the character printing, in order to enhance contrast, it is sometimes required to increase density of the dye or to increase the ink amount. On the other hand, in the graphic image printing, it is required high quality image having low granularity, increasing of the ink amount is not desirable. Furthermore, since the colors, such as R (red), G (green), B (blue) are expressed by overlapping the Y, M, C inks, increased amount of inks should cause bluing. Thus, when the viscosity of the inks are differentiated in respective nozzle groups or when the ink amount per one dot is differentiated, the recovering operation can be performed at optimal timing by setting appropriate constant N for each nozzle group.

(Fourth Embodiment)

Figure 7:
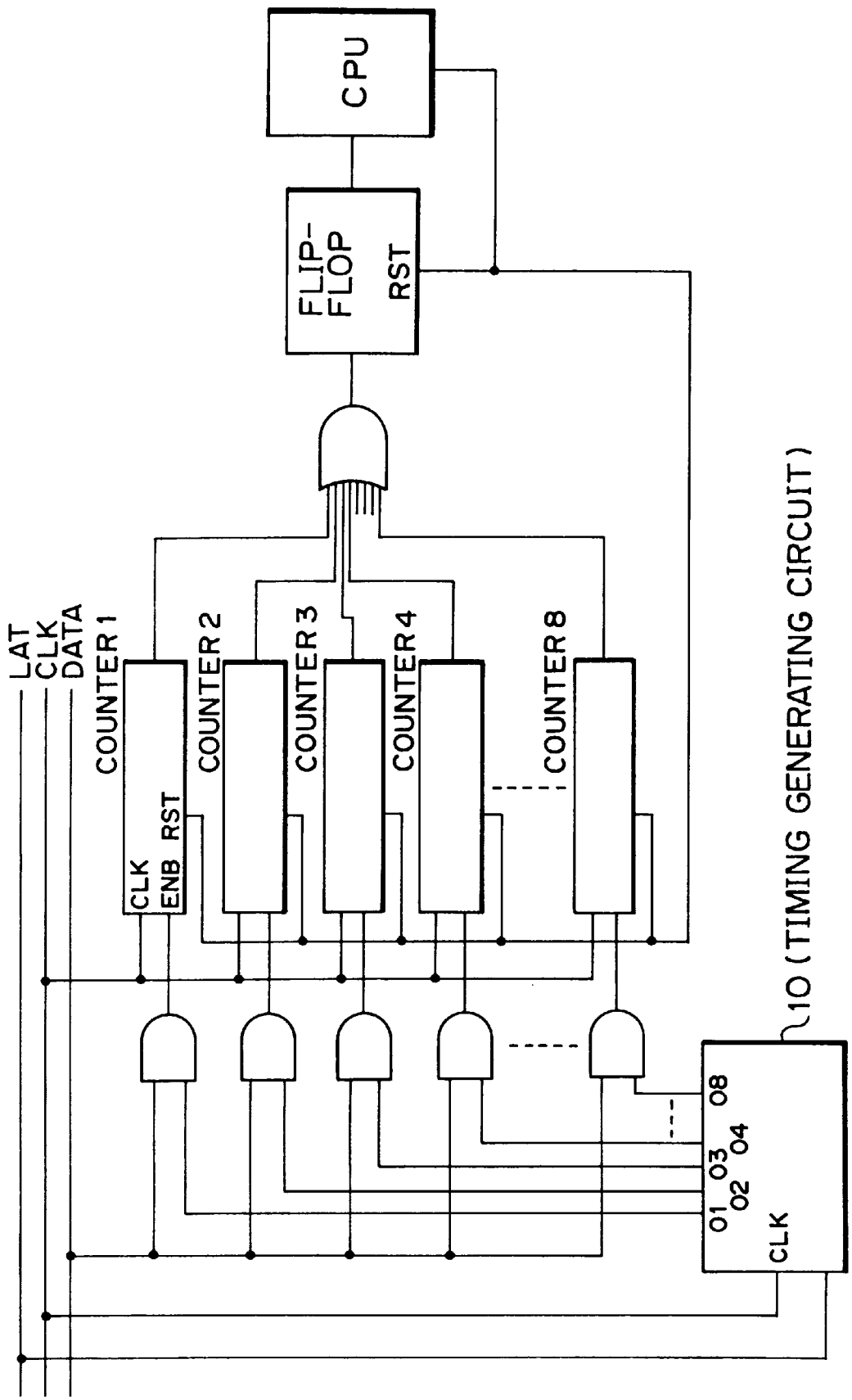
FIG. 7 is a block diagram showing the major portion of the fourth embodiment of the invention.
Figure 8:
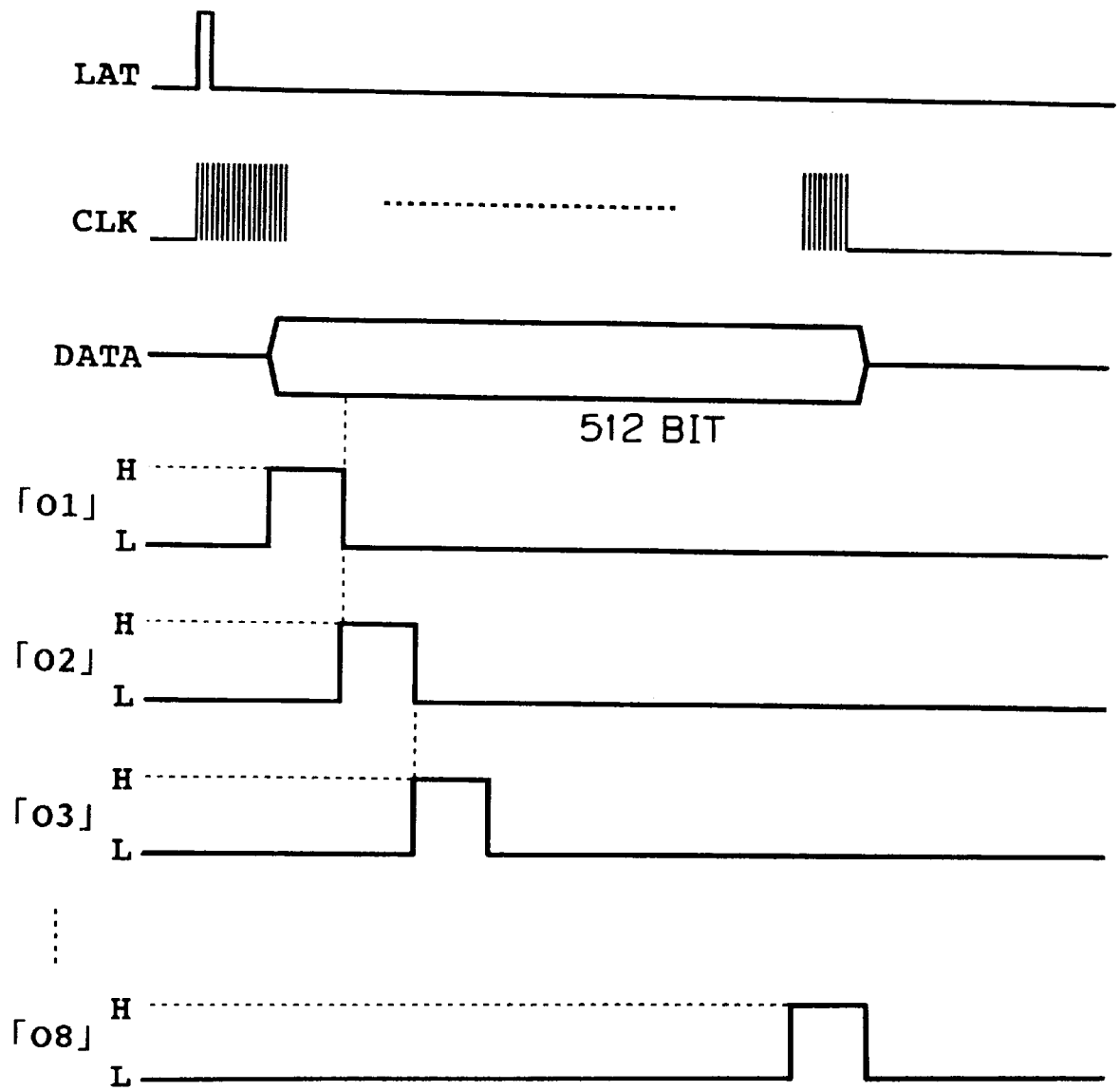
FIG. 8 is a timing chart showing operation of the fourth embodiment of the invention.

FIGS. 7 and 8 are fourth embodiment of the present invention.

In the shown embodiment, access to the RAM 5 (see FIG. 1) is avoided and intervention of the CPU 1 is minimized by counting the ink ejection data in the image data during data transfer from the buffer memory 3 to the printing head 6 (see FIG. 9) for speeding up the data processing.

Namely, during an output period for 64 clocks of a clock (CLK) signal from resetting of a timing generating circuit 10 (see FIG. 7) in response to a latch (LAT) signal, the output terminal "01" of the timing generating circuit 10 is held "H". At this time, when the printing data is fed to the data line, pulses, the number of which corresponds to the number of the ink ejection data in the printing data, are input to an enabling (ENB) terminal of a counter 1. In the next output period for 64 clocks of the CLK signal, the output terminal "02" of the timing generating circuit 10 becomes "H", the number of ink ejection data in the printing data is counted by a counter 2. In this manner, counting of the ink ejection data in the printing data corresponding to respective nozzle blocks are repeated by counters 1 to 8. Then, when any one of the counters 1 to 8 causes overflow, an overflow signal is generated. In response to this overflow signal, an output of a flip-flop becomes "H". These process is performed simultaneously with data transfer from the buffer memory 5 to the printing head 6. On the other hand, since the CPU 1 does not intervene, such counting operation will never affect for a process period of printing operation. The CPU 1 is responsive to the "H" level output of the flip-flop to generate a reset signal to perform recovering operation after printing operation for one line. On the other hand, as long as "L" level output of the flip-flop is maintained, data transfer for next one line is initiated. Thus, recovering operation can be performed at the optimal timing without significantly increasing the process steps of the CPU 1.

(Others)

It should be noted that the present invention is applicable not only for the serial type printing apparatus but also for the printing apparatus having a full-line type printing head which has a length corresponding to the maximum width of the printing medium. Of course, various constructions of the recovering means can be employed adapting to the configuration of the printing head.

As set forth above, the ink-jet printing apparatus according to the present invention is constructed to count the number of the ink ejection data in the corresponding image data per groups of a plurality of nozzles and to operate the recovering means depending upon the result of counting, the number of times to perform recovering operation can be limited to the necessary minimum number. Consequently, damaging of ejection opening forming surface of the printing head or wasting of the ink can be avoided to permit recovering operation for the printing head under optimal condition to constantly maintain good printing quality.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An ink-jet printing apparatus for performing image printing by ejecting ink from a printing head having a plurality of nozzles for ejecting ink according to image data, said plurality of nozzles including a plurality of nozzle groups and said image data including ink ejection data, the apparatus comprising:

recovering means for recovering ink ejection conditions of said nozzles in said printing head;

counting means for counting a number of said ink ejection data in said image data for a predetermined amount of printing;

storage means for storing numbers of said ink ejection data for the predetermined amount of printing and corresponding to each of the plurality of nozzle groups, the numbers having been counted by said counting means since a last operation of said recovering means; and control means, connected to said recovering means and to said counting means, for operating said recovering means based upon the stored numbers of said ink ejection data corresponding to each nozzle group.

2. An ink-jet printing apparatus as claimed in claim 1, wherein said control means operates said recovering means when the stored numbers become greater than or equal to a predetermined number, and in conjunction therewith clears said stored numbers from the storage means.

3. An ink-jet printing apparatus as claimed in claim 2, wherein said printing apparatus is a serial scan type ink-jet printing apparatus, and said predetermined amount of printing corresponds to one line.

4. An ink-jet printing apparatus as claimed in claim 1, wherein each of said nozzle groups includes nozzles overlapping with an adjacent nozzle group.

5. An ink-jet printing apparatus as claimed in claim 1, wherein said recovering means includes a wiper for scraping an ejection opening forming surface of the printing head.

6. An ink-jet printing apparatus as claimed in claim 1, wherein said recovering means includes a pump for discharging the ink from said printing head.

7. An ink-jet printing apparatus as claimed in claim 1, wherein said printing apparatus is a serial scan type ink-jet printing apparatus, and said predetermined amount of printing corresponds to one line.

8. An ink-jet printing apparatus as claimed in claim 1, wherein said printing head is divided into a plurality of nozzle groups for respective color inks and into a plurality of nozzle groups with respect to black ink.

9. An ink-jet printing apparatus as claimed in claim 8, wherein said plurality of nozzle groups for the black ink includes nozzles overlapping with an adjacent nozzle group.

10. An ink-jet printing apparatus as claimed in claim 1, wherein said counting means includes a plurality of counters respectively corresponding to said plurality of nozzle groups and means for distributing the printing data to respectively corresponding plurality of counters, and said counting means generates an overflow signal when said number of ink ejection data in said image data reaches a predetermined number.

11. A method of recovering an ink ejection condition for an ink-jet printing apparatus for performing image printing by ejecting ink from a printing head having a plurality of nozzles for ejecting ink according to image data, said plurality of nozzles including a plurality of nozzle groups, said method comprising the steps of:

counting a number of ink ejection data in said image data per each nozzle group for a predetermined amount of printing;

adding a number counted in said counting step to a number of ink ejection data for a nozzle group counted since a last recovering operation so as to produce a total number of ink ejection data for the nozzle group since the last recovering operation; and performing a recovering operation on said printing head based on the total number of ink ejection data.

12. A method according to claim 11, wherein the recovering operation is performed in a case that the total number of ink ejection data for the nozzle group is greater than or equal to a predetermined number, and in conjunction therewith the total number of ink ejection data for the nozzle group is zeroed.

13. A method according to claim 12, wherein said printing apparatus is a serial scan type ink-jet printing apparatus, and said predetermined amount of printing corresponds to one line.

14. A method according to claim 11, wherein each of said nozzle groups includes nozzles overlapping with an adjacent nozzle group.

15. A method according to claim 11, wherein the recovering operation includes scraping an ejection opening forming surface of the printing head with a wiper.

16. A method according to claim 11, wherein the recovering operation includes discharging the ink from the printing head with a pump.

17. A method according to claim 11, wherein said printing apparatus is a serial scan type ink-jet printing apparatus, and said predetermined amount of printing corresponds to one line.

18. A method according to claim 11, wherein said printing head is divided into a plurality of nozzle groups for respective color inks and into a plurality of nozzle groups for black ink.

19. A method according to claim 18, wherein said plurality of nozzle groups for the black ink includes nozzle groups overlapping with an adjacent nozzle group.

20. A method according to claim 11, wherein a plurality of counters respectively corresponding to said plurality of nozzle groups counts the number of ink ejection data, and an overflow signal is generated when the number of ink ejection data in the image data reaches a predetermined number.

* * * * *

UNITED STATES PATENT AND TRADEMARK OFFICE
CERTIFICATE OF CORRECTION

| | |
|---|---|
| PATENT NO. : 6,033,051 | Page 1 of 1 |
| DATED : March 7, 2000 | |
| INVENTOR(S) : Mineo Kaneko | |

It is certified that error appears in the above-identified patent and that said Letters Patent is hereby corrected as shown below:

Title page,
Under Foreign Patent Documents, "2141248" should read -- 2-141248 --; "05064890" should read -- 5-064890 --; and "406155742" should read -- 6-155742 --.

Column 4:
Line 53, "$n \geq N$," should read -- $> N$, --.

Column 7:
Line 63, "when" should read -- based on a condition --.

Column 8:
Line 46, "in a case" should read -- based on a condition --.

Signed and Sealed this

Twenty-eighth Day of August, 2001

Attest:

NICHOLAS P. GODICI
*Attesting Officer*    *Acting Director of the United States Patent and Trademark Office*